US006156995A

United States Patent [19]

Severance, Jr.

[11] Patent Number: 6,156,995

[45] Date of Patent: Dec. 5, 2000

[54] WATER-INJECTION NOZZLE ASSEMBLY WITH INSULATED FRONT END

[75] Inventor: Wayne Stanley Severance, Jr., Darlington, S.C.

[73] Assignee: The ESAB Group, Inc., Florence, S.C.

[21] Appl. No.: 09/204,632

[22] Filed: Dec. 2, 1998

[51] Int. Cl.[7] .................................................. B23K 9/00

[52] U.S. Cl. .................................... 219/121.5; 219/121.59

[58] Field of Search .................................... 219/121.5, 75, 219/121.48, 121.52, 121.59

[56] References Cited

U.S. PATENT DOCUMENTS

| | | | |
|---|---|---|---|
| 3,641,308 | 2/1972 | Couch, Jr. et al. . | |
| 3,930,139 | 12/1975 | Bykhovsky et al. . | |
| 4,311,897 | 1/1982 | Yerushalmy . | |
| 4,421,970 | 12/1983 | Couch, Jr. . | |
| 4,430,546 | 2/1984 | Irons et al. . | |
| 4,782,210 | 11/1988 | Nelson et al. . | |
| 4,861,962 | 8/1989 | Sanders et al. . | |
| 4,954,688 | 9/1990 | Winterfeldt . | |
| 5,023,425 | 6/1991 | Severance, Jr. et al. | 219/121.59 |
| 5,124,525 | 6/1992 | Severance, Jr. et al. . | |
| 5,132,512 | 7/1992 | Sanders et al. . | |
| 5,304,770 | 4/1994 | Takabayashi | 219/121.5 |
| 5,308,949 | 5/1994 | Reed | 219/121.5 |
| 5,393,952 | 2/1995 | Yamaguchi et al. | 219/121.5 |
| 5,396,043 | 3/1995 | Couch, Jr. et al. | 219/121.5 |
| 5,628,924 | 5/1997 | Yoshimitsu et al. | 219/121.5 |
| 5,653,895 | 8/1997 | Shintani . | |
| 5,660,743 | 8/1997 | Nemchinsky . | |
| 5,747,767 | 5/1998 | Severance et al. . | |

OTHER PUBLICATIONS

Sketch of Hypertherm HT–4100 260A $O_2$ Nozzle PN–020719.

*Primary Examiner*—Philip H. Leung
*Assistant Examiner*—Quang Van
*Attorney, Agent, or Firm*—Alston & Bird LLP

[57] ABSTRACT

A nozzle assembly for a plasma arc torch includes inner and outer metal nozzle members and an annular insulating element press-fit between the inner and outer nozzle members so that the nozzle members are electrically insulated from one another and bores of the nozzle members are coaxial. Additionally, the annular insulating element is constructed such that the inner and outer nozzle members are secured together to define a water passageway between the interior surface of the outer nozzle member and the exterior surface of the inner nozzle member. The nozzle assembly may further include an outer insulating element secured onto the exterior surface of the outer nozzle member, in which case the annular insulating element between the nozzle members may not be press-fit to the nozzle members. The annular insulating element may define at least one port for introducing water into the water passageway. The port extends in a direction that is generally tangential to an imaginary circle around the longitudinal discharge axis so that the water swirls in the water passageway. Alternatively, the nozzle assembly includes an annular insulating swirl ring press-fit between the inner and outer nozzle members. The swirl ring is displaced along the longitudinal discharge axis from the first annular insulating element and is positioned between the first annular insulating element and the bore of the inner nozzle member.

23 Claims, 7 Drawing Sheets

WATER-INJECTION NOZZLE ASSEMBLY WITH INSULATED FRONT END

FIELD OF THE INVENTION

The invention relates to a water-injection nozzle assembly for a plasma arc torch, and more particularly to a water-injection nozzle assembly with an insulated front end.

BACKGROUND OF THE INVENTION

Plasma arc torches are commonly used for cutting, welding, surface treating, melting, or annealing a metal workpiece. Such working of the workpiece is facilitated by a plasma arc that extends from the plasma arc torch to the workpiece. In one type of plasma arc torches, a shielding gas is used to surround and control the plasma arc. In contrast, in another type of plasma arc torches, water is used to surround and control the plasma arc. The gas or water that is used to surround and control the plasma arc generated by a plasma arc torch is typically also used to cool a nozzle assembly of the plasma arc torch. Water has a higher coefficient of heat transfer than gas; therefore, plasma arc torches that utilize water to cool their nozzle assemblies can typically operate at higher currents and therefore provide higher quality cuts than torches that utilize gas for cooling their nozzle assemblies. Plasma arc torches that utilize water as discussed above typically include water-injection nozzle assemblies. Examples of plasma arc torches with water-injection nozzle assemblies are disclosed in U.S. Pat. No. 5,747,767; 5,124,525 and 5,023,425, which are assigned to the assignee of the present invention.

A typical plasma arc torch that includes a water-injection nozzle assembly may further include a torch body defining a longitudinal discharge axis and an electrode secured to the torch body and having a discharge end. The water-injection nozzle assembly is mounted adjacent to the discharge end of the electrode. A typical water-injection nozzle assembly may include a metal inner nozzle member and a metal outer nozzle member that is radially outward from the inner nozzle member. The inner nozzle member defines a gas-constricting bore and the outer nozzle member defines a water-constricting bore. The nozzle members are fit together so that the bores are coaxially aligned with the longitudinal discharge axis defined by the torch body, and a water passageway is defined between the interior surface of the outer nozzle member and the exterior surface of the inner nozzle member.

A typical plasma arc torch includes an electrical source for generating an electrical arc that extends from the discharge end of the electrode. The water-injection nozzle assembly is separated from the electrode by a gas passage proximate to the discharge end of the electrode, and a vortical flow of a gas is provided through the gas passage. The electrical arc ionizes the gas to create the plasma arc, which extends along the longitudinal discharge axis and through the bores of the nozzle members to the workpiece. A water flow source supplies a vortical flow of water to the water passageway defined between the inner and outer nozzle members. The vortical flow of the water exits the water-constricting bore and constricts the plasma arc.

Concentricity of the inner and outer nozzle members is very important to proper operation of a plasma arc torch. U.S. Pat. Nos. 5,747,767 and 5,124,525 disclose inner and outer nozzle members that are press-fit together, by way of metal-to-metal contact, to center and maintain concentricity between the bores of the inner and outer nozzle members.

Avoiding “double arcing” is also important to proper operation of a plasma arc torch. Double arcing may occur when the workpiece, or molten splatter from the workpiece, accidentally contacts the metal outer nozzle member. When this happens, a second plasma arc, in addition to the main plasma arc, extends from the electrode through the inner nozzle member and the outer nozzle member, and ultimately to the workpiece. Insulating the outer nozzle member can reduce double arcing. For example, U.S. Pat. No. 5,124,525 discloses an outer nozzle member having a radially exterior surface and an outer insulating element secured onto the exterior surface of the outer nozzle member. These types of insulating elements are often formed of a ceramic material. Such ceramic insulating elements are somewhat brittle and are therefore subject to being broken when they come into contact with the workpiece or molten splatter from the workpiece.

Accordingly, there is a need for a water-injection nozzle assembly with an insulated front end that is less prone to breakage.

SUMMARY OF THE INVENTION

The present invention solves the problems identified above and provides other advantages, and comprises a water-injection nozzle assembly for a plasma arc torch, wherein the nozzle assembly includes inner and outer metal nozzle members and an annular insulating element press-fit between the inner and outer nozzle members. The annular insulating element is constructed such that the metal inner and outer nozzle members are electrically insulated from one another. Further, the annular insulating element is constructed so that a water-constricting bore of the outer nozzle member and a gas-constricting bore of the inner nozzle member are coaxial. The nozzle assemblies of the present invention may be mounted adjacent to a discharge end of an electrode mounted to a torch body, which defines a longitudinal discharge axis. The annular insulating element is constructed so that the water-constricting bore of the outer nozzle member and the gas-constricting bore of the inner nozzle member are coaxial with the longitudinal discharge axis of the torch body. Additionally, the annular insulating element is constructed such that the inner and outer nozzle members are secured together to define a water passageway between at least portions of an interior surface of the outer nozzle member and an exterior surface of the inner nozzle member. The water passageway is for communicating a flow of water to the water-constricting bore of the outer nozzle member.

In accordance with another aspect of the invention, the water-injection nozzle assembly further includes an outer insulating element secured onto an exterior surface of the outer nozzle member. The outer insulating element extends around and proximate to the water-constricting bore of the outer nozzle member. The outer insulating element is preferably constructed of a ceramic or plastic material.

In accordance with another aspect of the invention, the annular insulating element defines one or more ports for introducing water into the water passageway. Preferably the ports extend in a direction that is generally tangential to an imaginary circle around the longitudinal discharge axis, so that the ports introduce a vortical flow of water into the water passageway.

In accordance with another aspect of the invention, the water-injection nozzle assembly includes a second annular insulating element press-fit between the inner and outer nozzle members. The second annular insulating element is displaced along the longitudinal discharge axis from the first annular insulating element and is positioned between the first annular insulating element and the gas-constricting bore of the inner nozzle member. Preferably the second annular insulating element is a swirl ring, meaning that it defines one or more ports for introducing a vortical flow of water into the water passageway.

Advantageously, the present invention increases the service life of water-injection plasma arc torches by decreasing the likelihood of double arcing. This is achieved by insulating the metal inner and outer nozzle members from one another while at the same time providing superior concentricity of the outer and inner nozzle members. The advantages achieved by insulating the metal inner and outer nozzle members from one another are unexpected since water, which is typically thought of as being electrically conductive, flows through the water passageway defined between the nozzle members.

BRIEF DESCRIPTION OF THE DRAWINGS

For a more complete understanding of this invention reference should now be had to the exemplary embodiments illustrated in the accompanying drawings, which are described below.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that the disclosure will be thorough and complete, and will fully convey the scope of the invention to those skilled in the art. Like numbers refer to like elements throughout.

FIRST EMBODIMENT

Figure 1:
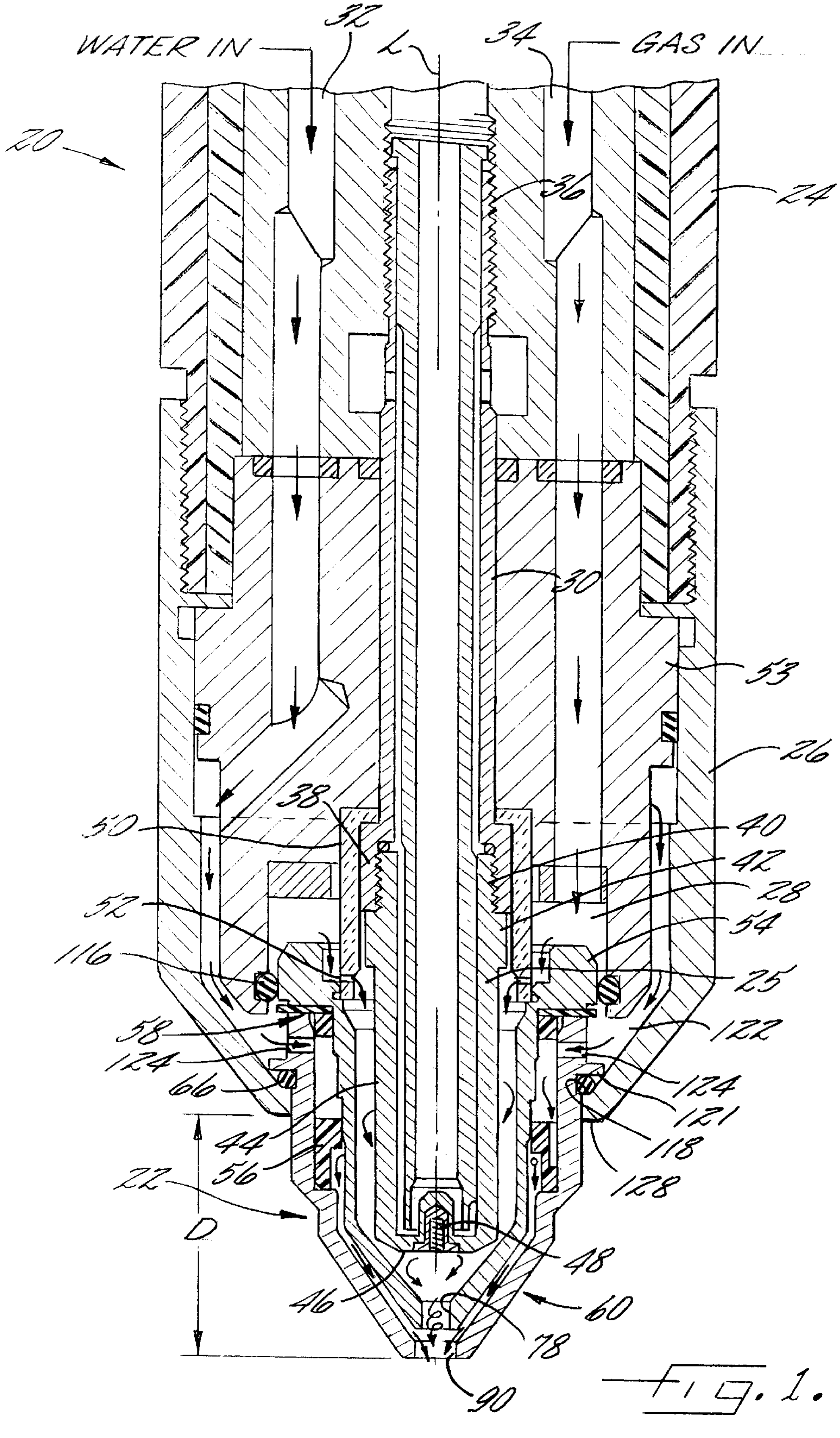
FIG. 1 is a sectional elevation view of a plasma arc torch including a water-injection nozzle assembly, in accordance with a first embodiment of the invention.

FIG. 1 illustrates a plasma arc torch, indicated generally at 20, according to a first embodiment of the invention. The torch 20 includes a torch body 24, an electrode 25, a water-injection nozzle assembly 22 and a nozzle assembly retaining cup 26. As discussed in greater detail below, the nozzle assembly 22 includes a pair of axially displaced annular insulating elements 56, 58 press-fit between a metal inner nozzle member 54 and a metal outer nozzle member 60. These press-fits are such that the nozzle members 54, 60 are coaxially aligned. These press-fits are also such that the metal nozzle members 54, 60 are electrically insulated from one another, so that the possibility of double arcing between nozzle members 54, 60 is reduced.

The torch body 24 is generally cylindrical, elongate and defines a longitudinal discharge axis L. At its lower end, the torch body 24 has a generally cylindrical cavity 28 therein for housing the electrode 25 and the water-injection nozzle assembly 22. The torch body 24 includes an electrode holder 30, a water inlet passageway 32 and a gas inlet passageway 34. The electrode holder 30 is generally cylindrical and is disposed within the cavity 28 of the torch body 24 and coaxially along the longitudinal discharge axis L. At its upper end, the electrode holder 30 includes an externally threaded portion 36 for engaging internal threads provided on the torch body 24, to secure the electrode holder to the torch body.

At its lower end, the electrode holder 30 preferably includes an internally threaded lower portion 38 for securing the electrode 25 on the torch body 24. Preferably, the electrode 25 includes an externally threaded portion 40 adjacent to an upper end 42 of the electrode for engaging the internally threaded lower portion 38 of the electrode holder 30. In other embodiments, however, the electrode 25 may be secured to the electrode holder 30 in any manner, for example by press-fit, that permits the electrode to be readily removed for replacement and ensures that the electrode is in good electrical contact with a conductor from an external power source (not shown). The electrode 25 is secured to the torch body 24 adjacent to the lower portion 38 of the electrode holder 30 and coaxially along the longitudinal discharge axis L.

The electrode 25 is electrically conductive and includes a generally cylindrical, elongate body 44 having a lower discharge end 46. Preferably, the discharge end 46 includes an emissive element 48 which acts as the cathode terminal for an electrical arc extending from the discharge end of the electrode 25 and along the longitudinal discharge axis L in the direction of a workpiece (not shown) positioned beneath the torch 20. An electrode including an emissive element is disclosed in U.S. Pat. No. 5,023,425, the entire disclosure of which is incorporated herein by reference, and which is assigned to the assignee of the present invention.

The emissive element 48 is composed of a material which has a relatively low work function, defined in the art as the potential step, measured in electron volts, that permits thermionic emission from the surface of a metal at a given temperature. In view of its low work function, the emissive element 48 readily emits electrons in the presence of an electric potential. Commonly used materials for fabricating these elements include hafnium, zirconium, tungsten, and alloys thereof.

A gas baffle 50 is preferably positioned adjacent to the upper end 42 of the electrode 25 and the lower portion 38 of the electrode holder 30. The gas baffle 50 has at least one, and preferably multiple radially inwardly directed, circumferentially-spaced holes 52 therein that direct gas from the gas inlet passageway 34 around the periphery of the body 44 of the electrode 25. As indicated by the arrows, gas from an external source (not shown) flows through the gas inlet passageway 34 into an annular chamber in the cavity 28 between the gas baffle 50 and the torch body 24. The pressurized gas encircles the gas baffle 50 and is forced through the holes 52 into a generally cylindrical chamber between the electrode 25 and the water-injection nozzle assembly 22 to form a swirling vortex of gas. The swirling flow of gas ionizes in the electrical arc extending from the discharge end 46 of the electrode 25 to create a plasma arc extending in the direction of the workpiece.

The electrode 25, upon being connected to the torch body 24 causes the gas baffle 50 and an elongate member 53 to be held in their assembled configuration. The gas baffle is constructed of an electrically insulating ceramic material and the elongate member 53 is constructed of an electrically insulating plastic material. The gas baffle 50 and the elongate member 53 electrically insulate the water-injection nozzle assembly 22 from the electrode 25.

The water-injection nozzle assembly 22 is positioned adjacent to the electrode 25 and coaxially along the longitudinal discharge axis L of the torch body 24. As mentioned above, the nozzle assembly 22 includes the inner nozzle member 54; the annular insulating element 56, which is preferably in the form of a insulating swirl ring 56; the annular insulating assembly 58, and the outer nozzle member 60. Those components of the nozzle assembly 22 are press-fit together such that the metal nozzle members 54, 60 are coaxially aligned and electrically insulated from one another, so that the possibility of double arcing between the nozzle members 54, 60 is reduced.

Figure 2:
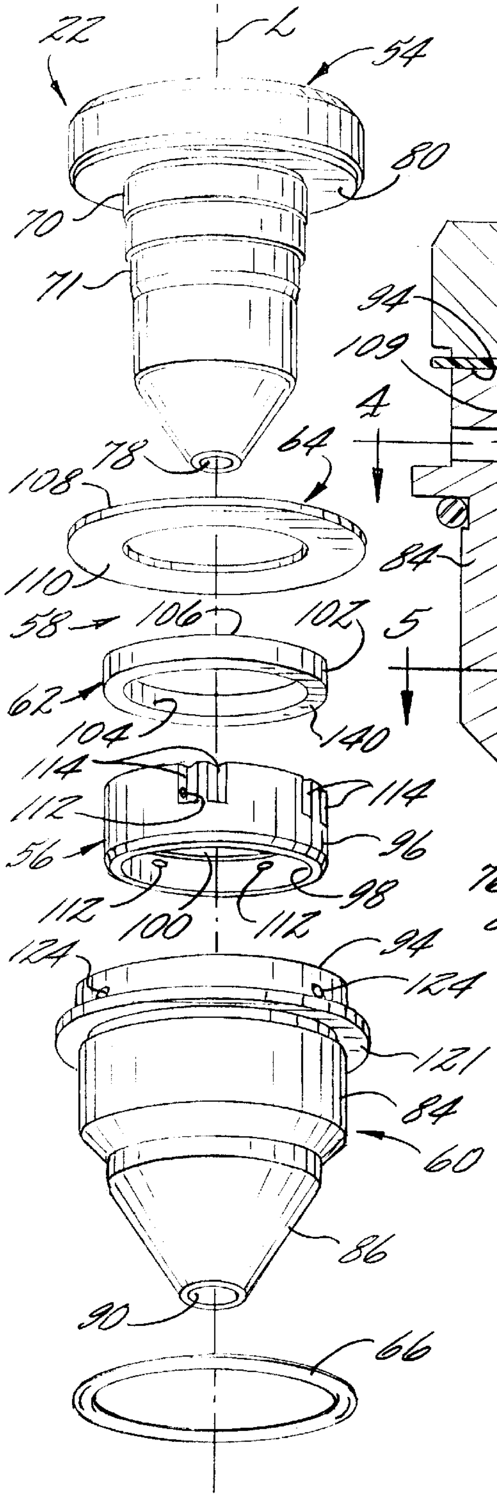
FIG. 2 is an exploded perspective view of the water-injection nozzle assembly of FIG. 1.

As illustrated in the exploded perspective view of FIG. 2, the insulating swirl ring 56 and the annular insulating assembly 58 are positioned over the inner nozzle member 54, and the outer nozzle member 60 is positioned in turn over the insulating swirl ring 56 and the annular insulating assembly 58. The annular insulating assembly 58 may consist of a lower insulating ring 62 and a upper insulating ring 64 that extends at least partially radially outwardly from the lower insulating ring 62. Alternatively, the annular insulating assembly 58 may be a unitary element that is absent of separate parts. For example, the lower and upper insulating rings 62, 64 may be molded together as a single piece. An annular ring 66, which may be in the form of an O-ring, is positioned over the outer nozzle member 60 for accepting the nozzle assembly retaining cup 26 (FIG. 1), as will be described.

Figure 3:
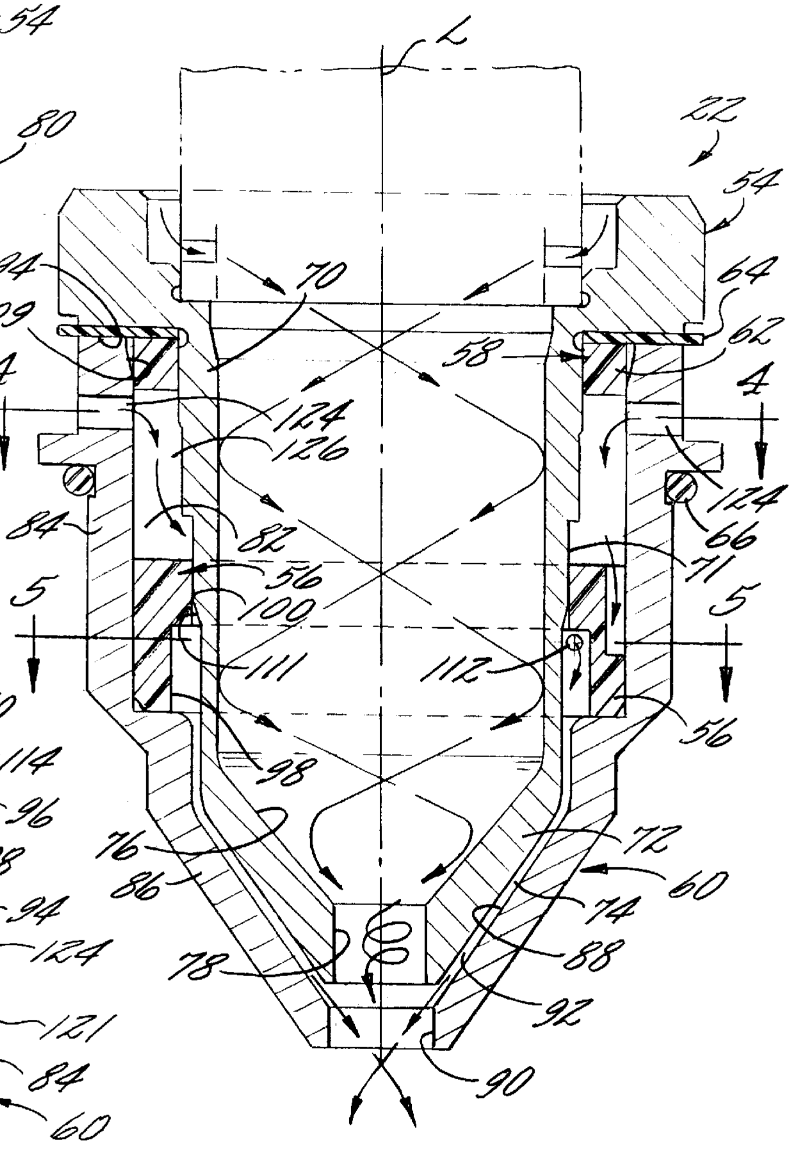
FIG. 3 is a sectional elevation view of the water-injection nozzle assembly of FIG. 1.

As best shown in the sectional elevation view FIG. 3, the inner nozzle member 54 has a cavity 68 formed therein and includes a generally cylindrical, upper portion 70; a generally cylindrical, middle portion 71 and a frusto conical lower portion 72. The lower portion 72 defines a convergent, frusto conical exterior surface 74 and a convergent, frusto conical interior surface 76 terminating at a gas-constricting bore 78. The gas-constricting bore 78 extends through the inner nozzle member 54 and is coaxially aligned with the longitudinal discharge axis L of the torch body 24. As indicated by the arrows, the interior surface 76 directs the swirling vortex of gas in the cavity 68 into the gas-constricting bore 78 to constrict the plasma arc in the direction of the workpiece. As best seen in FIG. 2, the inner nozzle member 54 further includes an annular, radially extending shoulder 80.

As best seen in FIG. 3, outer nozzle member 60 has a cavity 82 formed therein. The outer nozzle member 60 includes a generally cylindrical, upper portion 84 and a frusto conical, lower portion 86. The lower portion 86 defines a sharply convergent, frusto conical interior surface 88 terminating at a water-injection bore 90. The water-injection bore 90 extends through the outer nozzle member 60 and is coaxially aligned with the longitudinal discharge axis L of the torch body 24. The radially interior surface 88 of the lower portion 86 of the outer nozzle member 60 together with the radially exterior surface 74 of lower portion 44 of inner nozzle member 54 define an annular water passageway 92 for communicating the injection water from the water inlet passageway 32 (FIG. 1) to the water-injection bore 90. As best seen in FIG. 3, the upper end of the outer nozzle member 54 includes an annular, radially extending shoulder 94.

As best seen in FIG. 2, the annular insulating swirl ring 56 has a generally cylindrical, exterior surface 96 and a pair of generally cylindrical, radially interior surfaces 98, 100. The interior surface 98 is at a greater radius from the longitudinal discharge axis L than the interior surface 100. The lower insulating ring 62 of the annular insulating assembly 58 has a generally cylindrical outer surface 102, a generally cylindrical inner surface 104 and a radially extending annular upper surface 106. The upper insulating ring 64 of the annular insulating assembly 58 has annular upper and lower surfaces 108, 110.

The inner nozzle member 54, insulating swirl ring 56, annular insulating assembly 58, and outer nozzle member 60 are press-fit together so that the nozzle assembly 22 is assembled as illustrated in FIG. 3. That press-fit arrangement is facilitated by numerous surfaces being press-fit together. More specifically, and referring to FIGS. 3 and 4, the generally cylindrical outer surface 102 of the lower insulating ring 62 is in press-fit engagement with the generally cylindrical interior surface of the upper portion 84 of the outer nozzle member 60, and the generally cylindrical inner surface 104 of the lower insulating ring 62 is in press-fit engagement with the generally cylindrical exterior surface of the upper portion 70 of the inner nozzle member 54, to provide an upper press-fit connection. The press-fitting of the lower insulating ring 62 to the outer nozzle member 60 is at least partially facilitated by an annular chamfered portion 109 (FIG. 3) of the interior surface of upper portion 84 of outer nozzle member 60.

In accordance with the first embodiment of the invention, the upper surface 106 of the lower insulating ring 62 abuts a portion of the lower surface 110 of the upper insulating ring 64. The portion of the upper insulating ring 64 that extends radially away from the lower insulating ring 62 is fit between the shoulder 80 of the inner nozzle member 54 and the shoulder 94 of the outer nozzle member 60, such that the upper surface 108 of the upper insulating ring 64 abuts the shoulder 80 and the lower surface 110 of the upper insulating ring 64 abuts the shoulder 94.

The generally cylindrical exterior surface 96 of the insulating swirl ring 56 is in press-fit engagement with the generally cylindrical interior surface of the upper portion 84 of the outer nozzle member 60, and the generally cylindrical interior surface 100 of the insulating swirl ring 56 is in press-fit engagement with the generally cylindrical exterior surface of the middle portion 71 of the inner nozzle member 54 to provide a lower press-fit connection. The press-fitting of the insulating swirl ring 56 to the inner nozzle member 54 is at least partially facilitated by an annular chamfered portion 111 of the middle portion 71 of the inner nozzle member 54.

The axially displaced upper and lower press-fit connections are such that the insulating swirl ring 56, the annular insulating assembly 58, the inner nozzle member 54, the gas-constricting bore 78, the outer nozzle member 60, and the water-injection bore 90 are coaxially aligned with the longitudinal discharge axis L of the torch body 24. Further, each of the annular insulating assembly 58 and the insulating swirl ring 56 are constructed of an electrically insulating material, such as plastic or the like, such that the metal inner nozzle member 54 and the metal outer nozzle member 60 are electrically insulated from one another. Therefore, the possibility of double arcing between the metal inner nozzle member 54 and the metal outer nozzle member 60 is reduced. More specifically, the insulating swirl ring 56 and the lower insulating ring 62 may acceptably be constructed of acetal resin, such as that sold under the trademark Delrin by E.I. du Pont de Nemours and Company. The upper insulating ring 64 may acceptably be constructed of paper and/or pressboard insulation sold under the trademark Nomex by E.I. du Pont de Nemours and Company.

It is surprising that the water flowing through the water passageway 92 does not provide a good electrical communication path between the metal inner nozzle member 54 and the metal outer nozzle member 60. However, the inventor has discovered that the water typically used in water-injection torches is treated to remove contaminates and is of good quality such that the water is a reasonably good electrical insulator. Accordingly, although counterintuitive, it is advantageous to electrically insulate the inner nozzle member 54 and the outer nozzle member 60 from one another by way of the annular insulating assembly 58 and the insulating swirl ring 56. In this way the inventor has created an insulated press-fit nozzle assembly for a water-injection torch.

Figure 4:
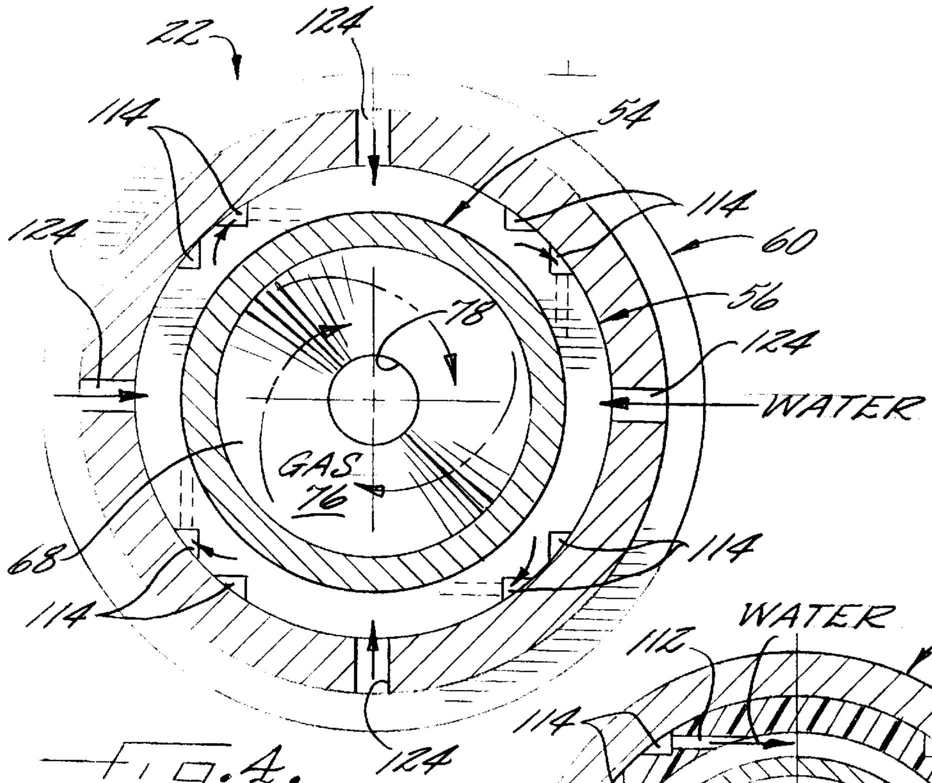
FIG. 4 is a cross-sectional view of the water-injection nozzle assembly of FIG. 1, taken along line 4—4 of FIG. 3.
Figure 5:
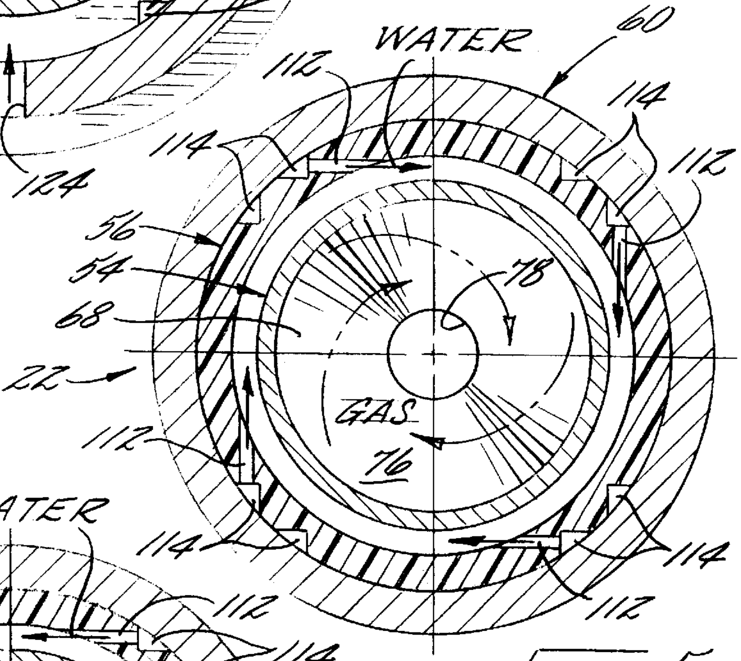
FIG. 5 is a cross-sectional view of the water-injection nozzle assembly of FIG. 1, taken along line 5—5 of FIG. 3.

Aspects of the insulating swirl ring 56 in addition to those discussed above are best seen in FIG. 2 and the sectional views of FIGS. 4 and 5. The insulating swirl ring 56 defines at least one, and preferably a plurality of tangentially-directed and circumferentially-spaced ports 112 extending inwardly from respective V-shaped notches 114. The ports 112 are preferably in the form of elongate cylindrical bores that are tangentially-directed with respect to an imaginary circle that is coaxial with the longitudinal discharge axis L. As illustrated, the insulating swirl ring 56 defines twice as many circumferentially arranged V-shaped notches 114 as ports 112, as will be discussed below. Each port 112 preferably extends from a flat surface defining a V-shaped notch 114 to the interior surface 98 of the insulating swirl ring 56. The ports 112 may be formed by drilling, and it is advantageous to drill into a flat surface of a V-shaped notch 114, because it can be difficult to drill into a non-flat surface.

As best seen in FIG. 1, once the water-injection nozzle assembly 22 is configured as illustrated in FIG. 3, the nozzle assembly 22 is then positioned within the cavity 28 of the torch body 24 against an O-ring 116 and over the electrode 25. Thereafter, the nozzle assembly retaining cup 26 is secured onto the torch body 24 such that the nozzle assembly 22 is held firmly between the lower edge of the gas baffle 50 and a lower shoulder 118 on the nozzle assembly retaining cup 26 against the annular ring 66. The annular ring 66 abuts an annular attachment shoulder 121 of the nozzle assembly 22, which in accordance with the first embodiment is defined by the outer nozzle member 60. The annular ring 66 and the O-ring 116 seal the water inlet passageway 32 and the gas inlet passageway 34, respectively.

As indicated by the arrows in FIGS. 3–5, the injection water, preferably from an external source (not shown), flows through the water inlet passageway 32 into an annular chamber 122 (FIG. 1) defined between the nozzle assembly 22 and the nozzle assembly retaining cup 26. The injection water is directed through at least one, and preferably multiple radially extending, circumferentially-spaced holes 124 in the outer nozzle member 60 and into a somewhat cylindrical chamber 126 (FIG. 3) between the inner nozzle member 54 and the outer nozzle member 60 above the insulating swirl ring 56. The injection water passes through the ports 112 in the insulating swirl ring 56, and thereafter into the water passageway 92 to form a swirling vortex of water in the water-injection bore 90. The orientation of the tangentially-directed and circumferentially-spaced ports 112 causes the swirling vortex of water. The swirling vortex of injection water further constricts the plasma arc exiting the gas-constricting bore 78 in the direction of the workpiece to provide "higher quality" cuts, such as cuts having a more square edge.

Figure 6:
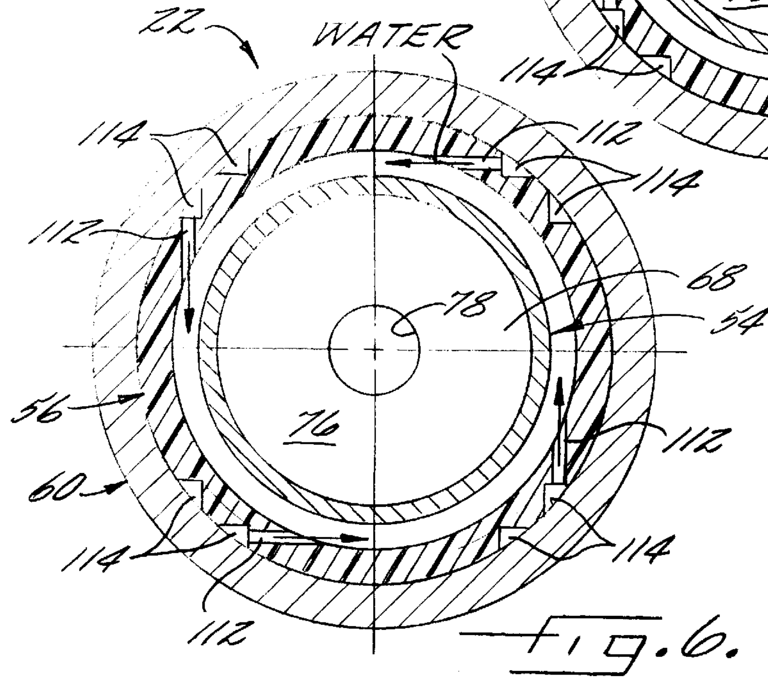
FIG. 6 is a cross-sectional view of a water-injection nozzle assembly in accordance with an alternative embodiment of the invention, wherein the nozzle assembly of FIG. 6 is sectioned similarly to the nozzle assembly of FIG. 5.

FIG. 6 is a cross-sectional view of a water-injection nozzle assembly 22 in accordance with an alternative embodiment of the invention. The nozzle assembly 22 of FIG. 6 is sectioned similarly to the nozzle assembly 22 of FIG. 5. The insulating swirl ring 56 may be molded from plastic, and the mold may be constructed such that when the swirl ring 56 is removed from the mold it contains all of the V-shaped notches 114, but does not contain the ports 112. Thereafter, the ports 112 may be formed with respect to a first group of the V-shaped notches 114 so that the swirling vortex of water provided by the swirl ring 56 rotates clockwise, as illustrated in FIG. 5. Alternatively, the ports 112 may be formed with respect to a second group of the V-shaped notches 114 so that the swirling vortex of water provided by the swirl ring 56 rotates counter-clockwise, as illustrated in FIG. 6. The first group of V-shaped notches 114 are positioned so that the ports 112 extending perpendicularly from the appropriate flat surfaces of the first group of V-shaped notches are positioned to optimumly provide a clockwise vortex, as illustrated in FIG. 5. The second group of V-shaped notches 114 are positioned so that the ports 112 extending perpendicularly from the appropriate flat surfaces of the second group of V-shaped notches are positioned to optimumly provide a counter-clockwise vortex, as illustrated in FIG. 6. As illustrated in both of FIGS. 5 and 6, the ports 112 are straight and tangential to an imaginary circle centered about the longitudinal discharge axis L. That imaginary circle has a diameter that is smaller than the diameter of the interior surface 98 (FIG. 2) of the insulating swirl ring 56 and larger than the diameter of the portion of the inner nozzle member 54 that is cross-sectioned in FIGS. 5 and 6.

In accordance with an alternative embodiment of the invention, the swirl ring 56 is constructed of an electrically insulating material such as plastic, or the like, and is shaped like the swirl ring disclosed in U.S. Pat. No. 5,747,767, which is incorporated herein by reference.

Throughout all of the embodiments of the invention, the inner nozzle member 54 can be constructed of copper and the outer nozzle member 60 can be constructed of brass. Alternatively, however, the inner nozzle member 54 and the outer nozzle member 60 can both be constructed of copper. Brass has a lower melting point than copper and thus damages more easily. In addition, because copper has a higher coefficient of conductive heat transfer than brass, an outer nozzle member 60 constructed of copper more efficiently dissipates heat than an outer nozzle member 60 constructed of brass. Thus, molten material splattered from a workpiece onto an outer nozzle member 60 constructed of copper cools more rapidly than molten material on an outer nozzle member 60 constructed of brass and is less likely to be damaged.

The torch 20 illustrated in FIGS. 1–3 is of a type that is especially useful in forming beveled cuts. More specifically, in accordance with the first embodiment the nozzle members 54, 60 extend a substantial distance along the longitudinal discharge axis L. Further, the angle formed between the exterior surface 74 of the lower portion 44 of the inner nozzle member 54 and the longitudinal discharge axis L is preferably equal to the angle formed between the interior surface 88 of the lower portion 86 of the outer nozzle member 60 and the longitudinal discharge axis L. Those angles are less than about 60 degrees, and preferably less than about 45 degrees. In one specific embodiment, the angles are about 34 degrees, which permits the frusto conical portions of the inner nozzle member 54 and the outer nozzle member 60 to have a significant longitudinal extent. The distance D (FIG. 1) between the lower edge 128 of nozzle assembly retaining cup 26 and the lower end 38 of the extended water-injection nozzle assembly 22 is thus sufficient to permit the torch 20 to produce a bevel cut or weld, and a cut or weld within a sharp concavity on the top surface of the workpiece at a relatively short, predetermined stand-off distance. Typically, the distance D is on the order of 0.9 inches while the predetermined stand-off distance to produce the best quality and speed of cut or weld is typically on the order of 0.375 inches. Accordingly, a plasma arc torch provided with the extended water-injection nozzle assembly 22 illustrated in FIGS. 1–3 has the ability to produce a bevel cut or weld, and a cut or weld within a sharp concavity on the top surface of the workpiece, at a relatively short stand-off distance while centering and maintaining the concentricity of the water-injection bore 90 relative to the gas-constricting bore 78, and electrically insulating the inner nozzle member 54 from the outer nozzle member 60. Whereas the advantages relating to concentricity and insulating that are provided by the pair of axially displaced and press-fit annular insulating elements 56, 58 are illustrated in the context of a torch with a substantial distance D, those advantages can also be achieved in a torch with a smaller distance D.

SECOND EMBODIMENT

Figure 7:
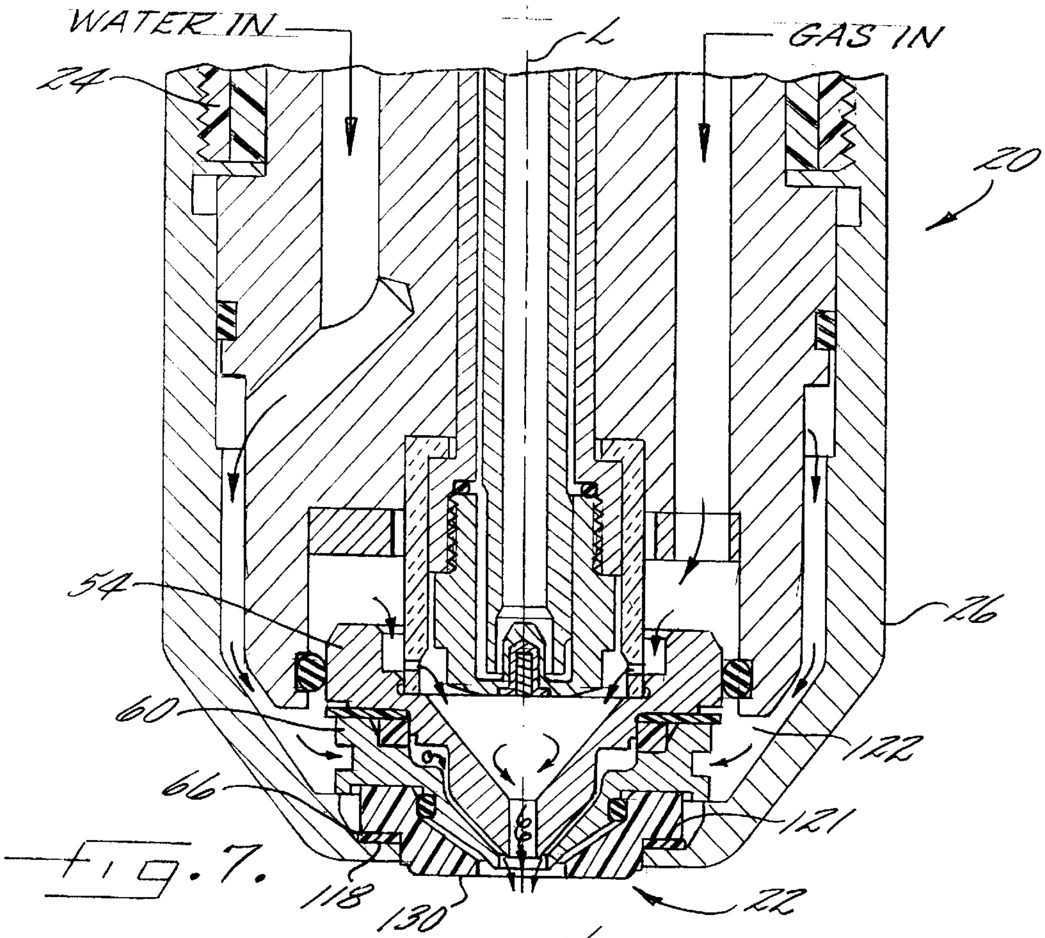
FIG. 7 is a sectional elevation view of a plasma arc torch including a water-injection nozzle assembly, in accordance with a second embodiment of the invention.
Figure 8:
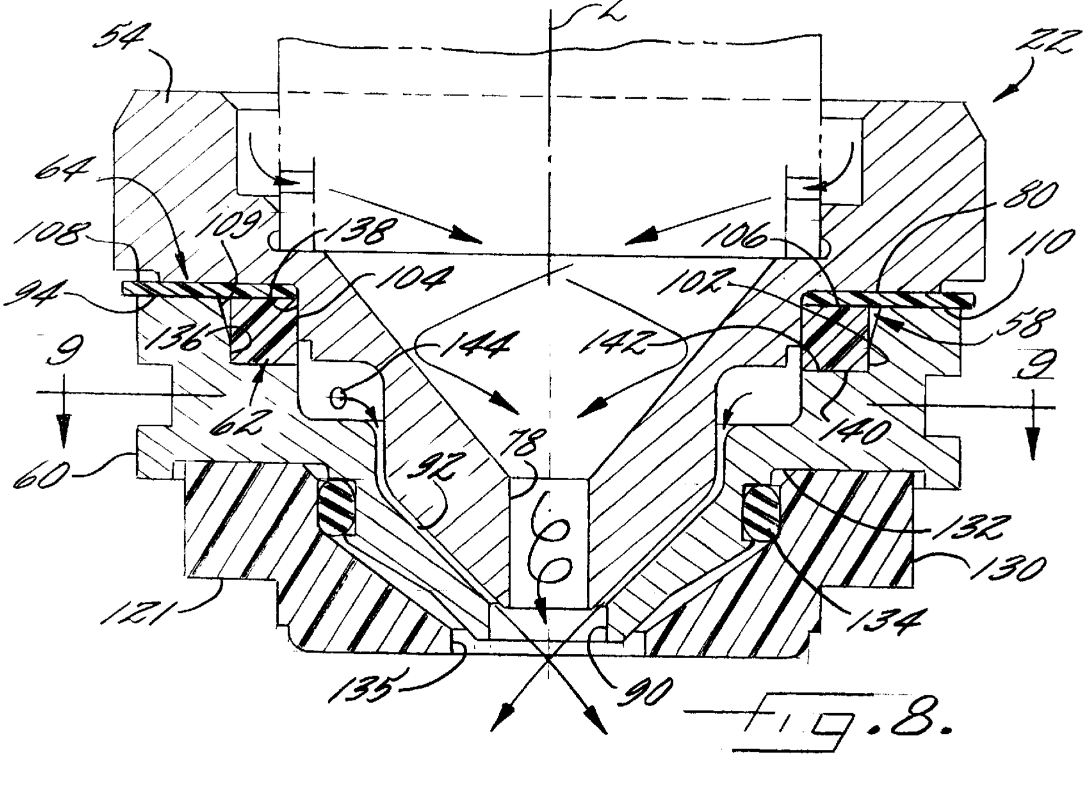
FIG. 8 is a sectional elevation view of the water-injection nozzle assembly of FIG. 7.
Figure 9:
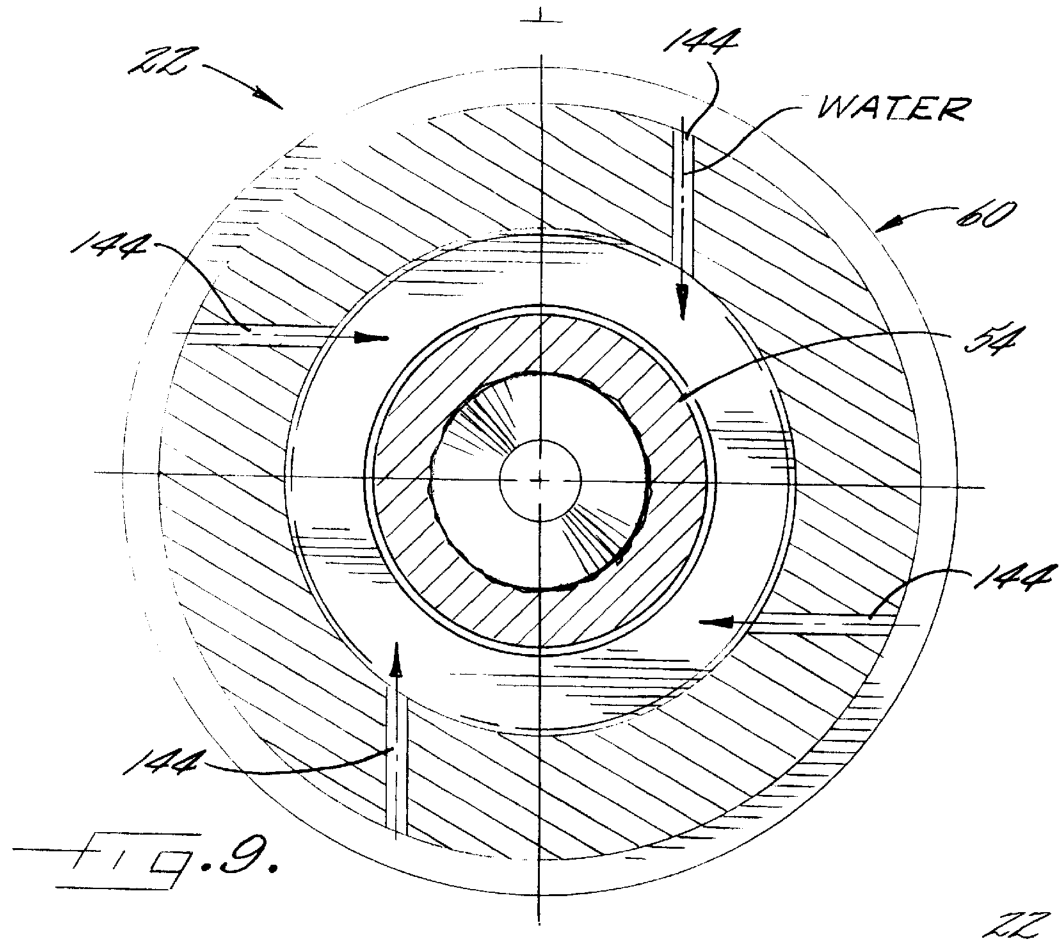
FIG. 9 is a cross-sectional view of the water-injection nozzle assembly of FIG. 7, taken along line 9—9 of FIG. 8.

FIGS. 7–9 illustrate components of a plasma arc torch 20 and a water-injection nozzle assembly 22 in accordance with a second embodiment of the invention. The components of the plasma arc torch 20 and the nozzle assembly 22 of the second embodiment are substantially similar to the corresponding components of the first embodiment of the invention, except for disclosed variations and variations that will be apparent to those skilled in the art in view of this disclosure.

As best seen in FIG. 8, the nozzle assembly 22 of the second embodiment does not include an insulating swirl ring (for example see the insulating swirl ring 56 of FIGS. 1–6). Further, the annular inner and outer nozzle members 54, 60 of the second embodiment are shaped differently than in the first embodiment, and the nozzle assembly 22 of the second embodiment further includes an annular outer insulating element 130 attached to and extending substantially along a radially exterior surface 132 of the outer nozzle member 60. The outer insulating element 130 functions in conjunction with the annular insulating assembly 58 so that the possibility of double arcing between the nozzle members 54, 60 is even further reduced.

The outer insulating element 130 is coaxial with the longitudinal discharge axis L of the torch 20. The outer insulating element 130 defines a bore 135 aligned with the longitudinal discharge axis L, and through which the plasma arc extends when the torch 20 is operating. The outer insulating element 130 defines the annular attachment shoulder 121 that cooperates with the annular ring 66 (FIG. 7) and the lower shoulder 118 (FIG. 7) of the nozzle assembly retaining cup 26 to secure the nozzle assembly 22 to the torch body 24.

The outer insulating element 130 is held into place by an O-ring 134, which engages an attachment shoulder on the outer insulating element 130 and a corresponding attachment shoulder on the outer nozzle member 60. The outer insulating element 130 is pressed onto the outer nozzle member 60, which compresses the O-ring 134 so that the O-ring interacts with the attachment shoulder on the outer insulating element 130 and the attachment shoulder on the outer nozzle member 60 to retain outer insulating element 130 onto the outer nozzle member 60. The O-ring 134 not only retains the outer insulating element 130 in place, but also seals between the outer insulating element 130 and the exterior surface 132 of the outer nozzle member 60 to prevent water exiting the water-injection bore 90 from passing between the outer nozzle member and the outer insulating element. Additionally or alternatively, the outer insulating element 130 may be attached to the outer nozzle member 60 by an adhesive substance, such as heat-resistant glue, or the like.

The outer insulating element 130 is preferably formed from a thermal and electrically insulating material, such as ceramic or plastic. An acceptable ceramic material is alumina, and an acceptable plastic material is polyetheretherkeytone (PEEK). The O-ring 134 may be formed from a variety of materials, such as silicone rubber or neoprene.

The inner nozzle member 54, annular insulating assembly 58, and outer nozzle member 60 are press-fit together so that the nozzle assembly 22 is assembled as illustrated in FIGS. 7 and 8. That press-fit arrangement is facilitated by numerous surfaces being press-fit together. More specifically, and referring to FIG. 8, the generally cylindrical outer surface 102 of the lower insulating ring 62 is in press-fit engagement with a generally cylindrical interior surface 136 of the outer nozzle member 60, and the generally cylindrical inner surface 104 of the lower insulating ring 62 is in press-fit engagement with a generally cylindrical exterior surface 138 of the inner nozzle member 54. The press-fitting of the lower insulating ring 62 to the outer nozzle member 60 is at least partially facilitated by the annular chamfered portion 109 of the interior surface of the outer nozzle member 60. A lower annular surface 140 (also see FIG. 2) of the lower insulating ring 62 abuts an annular shoulder 142 of the outer nozzle member 60. The annular shoulder 142 extends radially inward from the cylindrical inner surface 136 of the outer nozzle member 60. The annular shoulder 142 and the cylindrical inner surface 136 at least partially define an annular channel that receives the lower insulating ring 62.

The upper insulating ring 64 can be characterized as being part of the press-fit connection between the inner and outer nozzle members 54, 60, although in some embodiments that press-fit connection may not include the upper insulating ring 64. In accordance with the second embodiment of the invention, the upper surface 106 of the lower insulating ring 62 abuts a portion of the lower surface 110 of the upper insulating ring 64. The portion of the upper insulating ring 64 that extends radially away from the lower insulating ring 62 is fit between the shoulder 80 of the inner nozzle member 54 and the shoulder 94 of the outer nozzle member 60, such that the upper surface 108 of the upper insulating ring 64 abuts the shoulder 80 and the lower surface 110 of the upper insulating ring 64 abuts the shoulder 94.

The press-fit connection is such that the annular insulating assembly 58, the inner nozzle member 54, the gas-constricting bore 78, the outer nozzle member 60, and the water-injection bore 90 are coaxially aligned with the longitudinal discharge axis L of the torch body 24; the metal inner nozzle member 54 and the metal outer nozzle member 60 are electrically insulated from one another; and the annular water passageway 92 is defined between the nozzle members 54, 60.

As best seen in FIG. 9, the outer nozzle member 60 defines at least one, or more preferably a plurality of tangentially-directed and circumferentially-spaced ports 144. The ports 144 are preferably in the form of elongate cylindrical bores that are tangentially-directed with respect to an imaginary circle that is coaxial with the longitudinal discharge axis L. The ports 144 communicate with the annular chamber 122 (FIG. 7) defined between the nozzle assembly 22 and the nozzle assembly retaining cup 26. The injection water from the annular chamber 122 passes through the ports 144 into the water passageway 92 to form a swirling vortex of water in the water-injection bore 90. The orientation of the tangentially-directed and circumferentially-spaced ports 144 causes the swirling vortex of water. The inlet openings of the ports 144 communicate with the annular chamber 122.

THIRD EMBODIMENT

Figure 10:
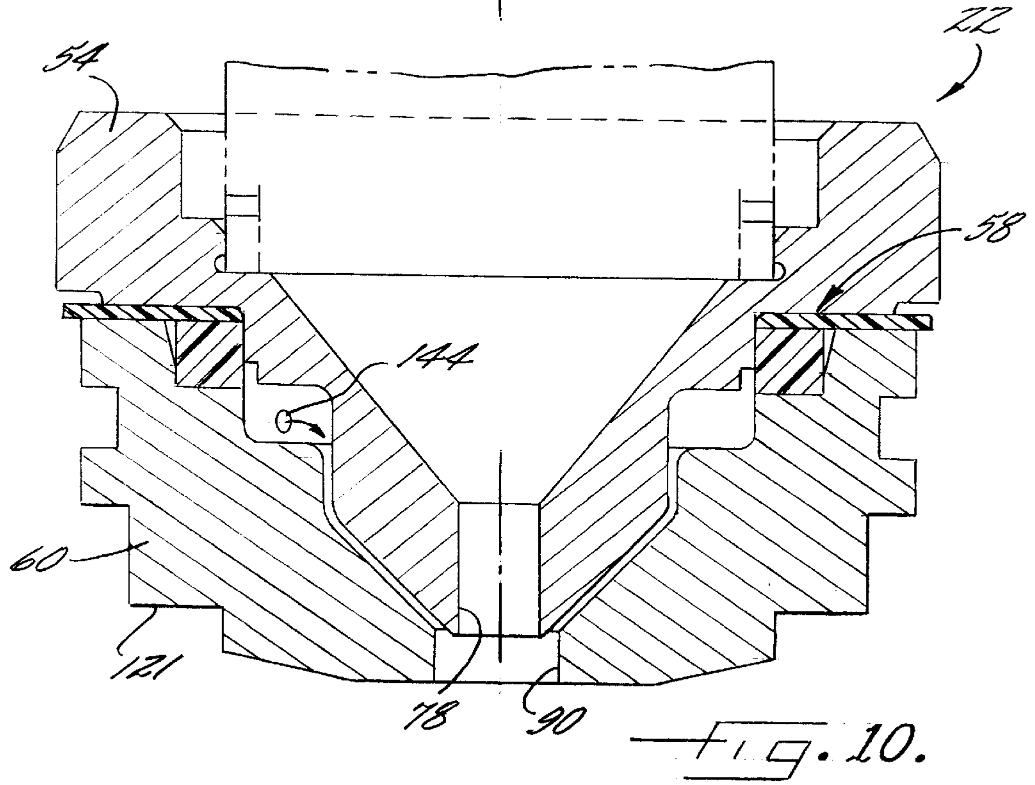
FIG. 10 is a sectional elevation view of a water-injection nozzle assembly in accordance with a third embodiment of the invention.

FIG. 10 is a sectional elevation view of a water-injection nozzle assembly 22 in accordance with a third embodiment of the invention. The torch 20 and nozzle assembly 22 of the third embodiment of the invention are substantially similar to the torch 20 and the nozzle assembly 22 of the second embodiment, except for disclosed variations and variations that will be apparent to those skilled in the art in view of this disclosure.

As illustrated in FIG. 10, the nozzle assembly 22 of the third embodiment does not include an outer insulating element and associated O-ring (for example see the outer insulating element 130 and O-ring 134 of FIG. 8). Rather, as compared to the outer nozzle member 60 of the second embodiment, the outer nozzle member 60 of the third embodiment is shaped differently and enlarged, and includes the annular attachment shoulder 121.

FOURTH EMBODIMENT

Figure 11:
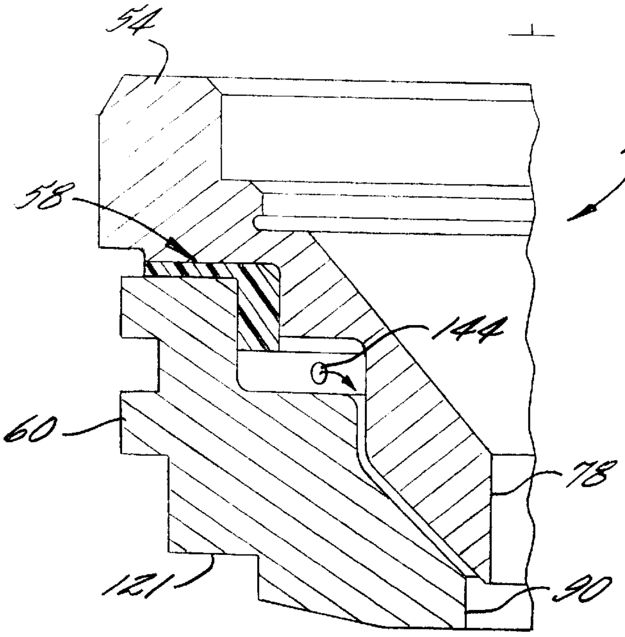
FIG. 11 is a partial, sectional elevation view of a water-injection nozzle assembly in accordance with a fourth embodiment of the invention.

FIG. 11 is a partial, sectional elevation view of a water-injection nozzle assembly 22 in accordance with a fourth embodiment of the invention. The torch 20 and nozzle assembly 22 of the fourth embodiment of the invention are substantially similar to the torch 20 and the nozzle assembly 22 of the third embodiment, except for disclosed variations and variations that will be apparent to those skilled in the art in view of this disclosure. For example, in accordance with the fourth embodiment the annular insulating element 58 is unitary, meaning that it is absent of separate but joinable parts.

FIFTH EMBODIMENT

Figure 12:
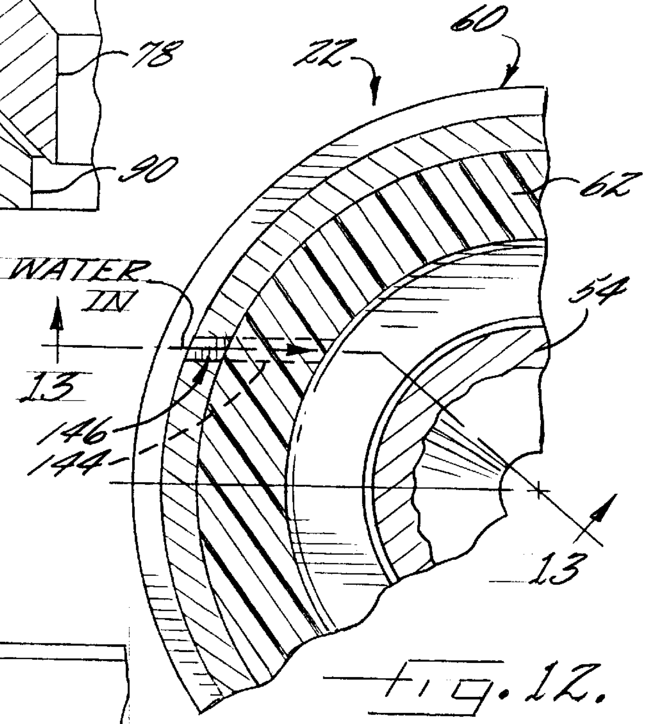
FIG. 12 is a partial, cross-sectional view of a water-injection nozzle assembly taken along line 12—12 of FIG. 13, in accordance with a fifth embodiment of the invention.
Figure 13:
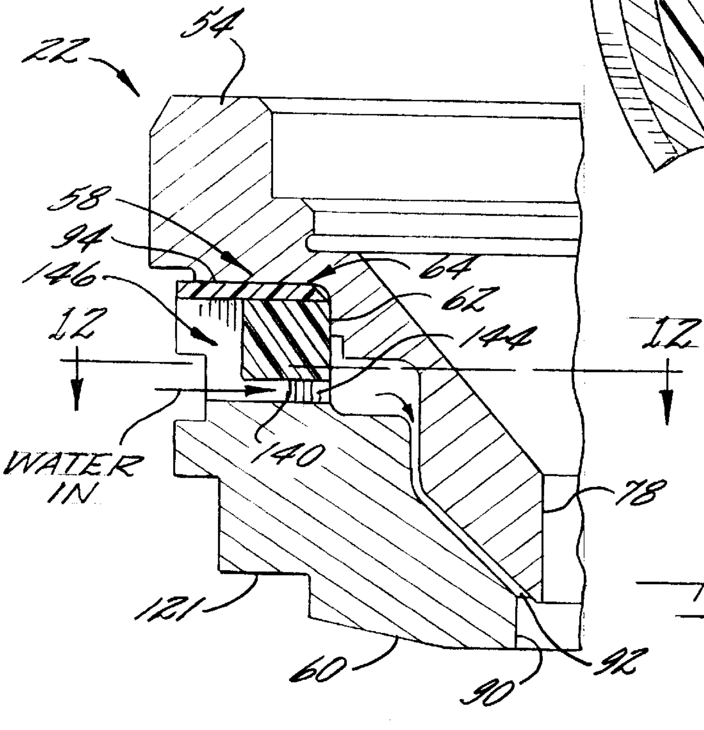
FIG. 13 is a partial, cross-sectional view of the water-injection nozzle assembly of FIG. 12, taken substantially along line 13—13 of FIG. 12.

FIGS. 12–13 illustrate a water-injection nozzle assembly 22 in accordance with a fifth embodiment of the invention. The torch 20 and nozzle assembly 22 of the fifth embodiment are substantially similar to the torch 20 and the nozzle assembly 22 of the third embodiment, except for disclosed variations and variations that will be apparent to those skilled in the art in view of this disclosure. For example, rather than including bored ports 144 (FIGS. 8 and 9) as in the third embodiment, the outer nozzle member 60 has at least one, and preferably multiple (e.g., four) tangentially-directed and circumferentially-spaced slots 146 that extend vertically downward into the outer nozzle member 60 from the annular upper shoulder 94 (also see FIG. 2) of the outer nozzle member 60. The slots 146 may be formed by milling vertically downward into the outer nozzle member 60 from the annular upper shoulder 94.

When the nozzle assembly 22 of the fifth embodiment is assembled as illustrated in FIGS. 12–13, the insulating ring 62 partially closes each slot 146, but does not completely fill each slot 146. As a result, portions of the lower annular surface 140 (also see FIG. 2) of the lower insulating ring 62 that are opposite from the portions of the outer nozzle member 60 that define the bottom of each slot 146 at least partially define the multiple tangentially-directed and circumferentially-spaced ports 144 of the fifth embodiment.

As mentioned previously, the injection water from the annular chamber 122 (FIG. 13) passes through the ports 144 into the water passageway 92 (FIG. 13) to form a swirling vortex of water in the water-injection bore 90. The orientation of the tangentially-directed and circumferentially-spaced ports 144 causes the swirling vortex of water. The inlet openings of the ports 144 communicate with the annular chamber 122 when the torch 20 of the fifth embodiment is fully assembled.

In accordance with the fifth embodiment, and other embodiments, it may be preferable for the annular insulating assembly 58 not to include the upper insulating ring 64. In such a configuration, the vertical thickness of the lower insulating ring 62 may be increased so that the annular upper surface 106 (see FIG. 2) of the insulating ring 62 engages the annular shoulder 80 (see FIG. 2) of the inner nozzle member 54 to maintain a space between the annular shoulder 80 and the annular shoulder 94 (see FIG. 2) of the outer nozzle member 60.

SIXTH EMBODIMENT

Figure 14:
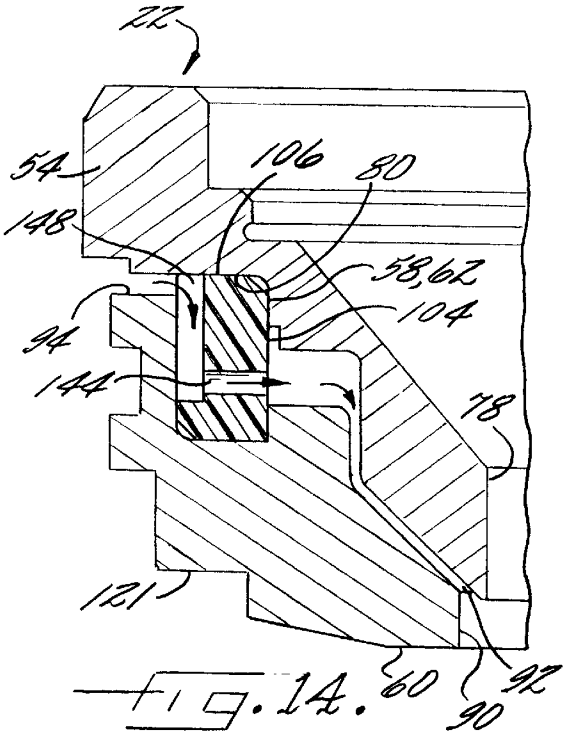
FIG. 14 is a partial, cross-sectional view of a water-injection nozzle assembly in accordance with a sixth embodiment of the invention, wherein the view of FIG. 14 is from a perspective substantially similar to the perspective of FIG. 13.

FIG. 14 illustrates a water-injection nozzle assembly 22 in accordance with a sixth embodiment of the invention. The torch 20 and nozzle assembly 22 of the sixth embodiment of the invention are substantially similar to the torch 20 and the nozzle assembly 22 of the third embodiment, except for disclosed variations and variations that will be apparent to those skilled in the art in view of this disclosure. For example, in accordance with the sixth embodiment, the annular insulating assembly 58 does not include the upper insulating ring 64 (FIG. 2), and the vertical thickness of the insulating ring 62 is increased so that the annular upper surface 106 of the insulating ring 62 engages the annular shoulder 80 of the inner nozzle member 54 to maintain an annular space between the annular shoulder 80 and the annular shoulder 94 of the outer nozzle member 60.

In accordance with the sixth embodiment, rather than the outer nozzle member 60 including the ports 144 (see FIGS. 8 and 9) as in the third embodiment, the insulating ring 62 defines at least one or preferably a plurality (e.g., four) of the ports 144, and corresponding V-shaped notches 148 that function as inlets to the ports 144. As mentioned previously, the injection water from the annular chamber 122 (FIG. 7) passes through the ports 144 into the water passageway 92 to form a swirling vortex of water in the water-injection bore 90. The orientation of the tangentially-directed and circumferentially-spaced ports 144 causes the swirling vortex of water. The inlet openings of the ports 144 (i.e., the V-shaped notches 148) communicate with the annular chamber 122 when the torch 20 of the sixth embodiment is fully assembled.

The insulating ring 62 of the sixth embodiment can be characterized as being shaped and constructed substantially similarly to the insulating swirl ring 56 (FIGS. 1–6). In this analogy, the ports 144 of the insulating ring 62 correspond to the ports 112 (FIGS. 2–6) of the swirl ring 56, and the V-shaped notches 148 of the insulating ring 62 correspond to the V-shaped notches 114 (FIGS. 2–6) of the swirl ring 56. Further, in accordance with the sixth embodiment, the generally cylindrical inner surface 104 of the insulating ring 62 is not radially tiered like the cylindrical inner surfaces 98, 100 (FIG. 2) of the swirl ring 56.

SEVENTH EMBODIMENT

Figure 15:
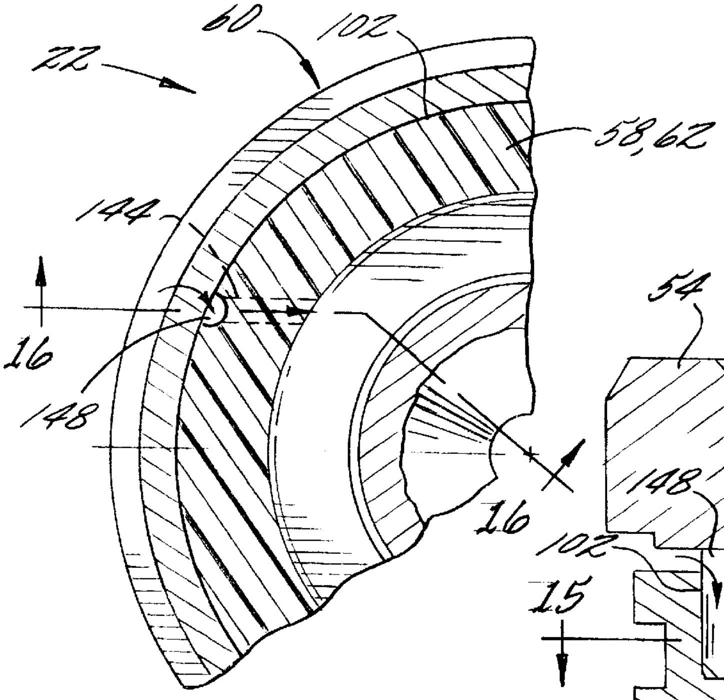
FIG. 15 is a partial, cross-sectional view of a water-injection nozzle assembly taken along line 15—15 of FIG. 16, in accordance with a seventh embodiment of the invention.
Figure 16:
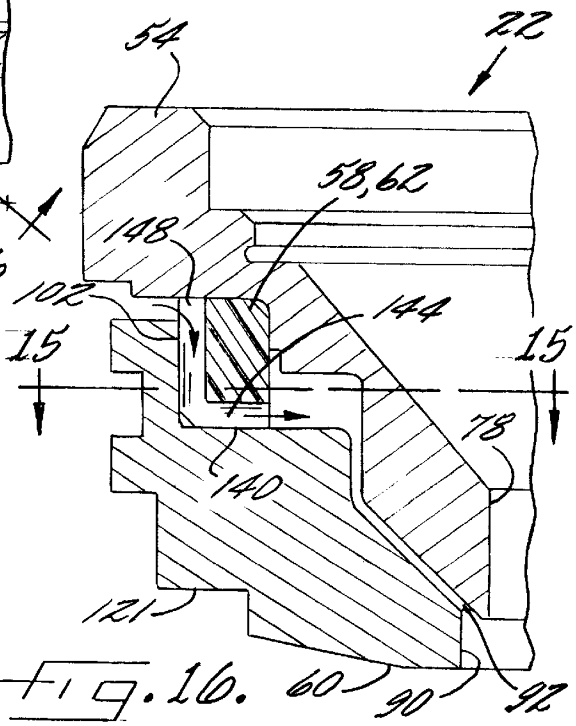
FIG. 16 is a partial, cross-sectional view of the water-injection nozzle assembly of FIG. 15, taken substantially along line 16—16 of FIG. 15.

FIGS. 15–16 illustrate a water-injection nozzle assembly 22 in accordance with a seventh embodiment of the invention. The torch 20 and nozzle assembly 22 of the seventh embodiment of the invention are substantially similar to the torch 20 and the nozzle assembly 22 of the sixth embodiment, except for disclosed variations and variations that will be apparent to those skilled in the art in view of this disclosure. In accordance with the seventh embodiment, the insulating ring 62 is molded so that the ports 144 and the notches 148 are each exposed along their entire length at the respective outer surface 102 (also see FIG. 3) and lower surface 140 (also see FIG. 3) of the insulating ring 62. Because the passages 144 are molded and need not be bored, the notches 148 may take on a more rounded shape if desired. Of course in accordance with the seventh embodiment the insulating ring 62 may be molded with a group of the ports 144 and notches 148 that provide clockwise vortical flow, or alternatively a group of ports and notches that provide counter-clockwise vortical flow, as should be understood with reference to FIGS. 5 and 6, and the discussions thereof.

Many modifications and other embodiments of the invention will come to mind to those skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation. Additionally, the accompanying drawings are not necessarily to scale; for example, in some cases the chamfered portions 109, 111 have been exaggerated in an effort to clarify the drawings, and in some cases those chamfered portions are not illustrated.

That which is claimed is:

1. A water injection plasma arc torch, comprising:

a torch body defining a longitudinal discharge axis;

an electrode secured to said torch body and comprising a discharge end; and a water-injection nozzle assembly mounted adjacent to said discharge end of said electrode, wherein said nozzle assembly comprises:

an inner nozzle member formed of metallic material and comprising a radially exterior surface, wherein said inner nozzle member defines a bore therethrough that is coaxially aligned with said longitudinal discharge axis defined by said torch body, an outer nozzle member formed of metallic material and comprising a radially interior surface, wherein said outer nozzle member is radially outward of said inner nozzle member and defines a bore therethrough that is coaxially aligned with said longitudinal discharge axis defined by said torch body, and an annular insulating element press-fit between said inner and outer nozzle members such that said inner and outer nozzle members are pressed together concentrically in a manner that a water passageway is defined between at least portions of said interior surface of said outer nozzle member and said exterior surface of said inner nozzle member for communicating a flow of water to said bore of said outer nozzle member, wherein said annular insulating element is constructed such that said metallic inner and outer nozzle members are electrically insulated from one another.

2. A plasma arc torch according to claim 1, wherein said annular insulating element is press-fit to said exterior surface of said inner nozzle member and is also press-fit to said interior surface of said outer nozzle member to provide said press-fit connection between said inner and outer nozzle members.

3. A plasma arc torch according to claim 1, wherein said inner nozzle member is formed of copper and said outer nozzle member is formed of copper.

4. A plasma arc torch according to claim 1, further comprising:

an electrical source for generating an electrical arc extending from said discharge end of said electrode;

a gas flow source for supplying a flow of a gas proximate to said discharge end of said electrode, wherein the plasma arc torch is constructed so that a vortical flow of the gas is adjacent to said discharge end of said electrode to generate a plasma flow extending along said longitudinal discharge axis, through said bores of said nozzle members; and a water flow source for supplying a flow of water to said water passageway, wherein said nozzle assembly is constructed so that a vortical flow of the water constricts said plasma flow extending along said longitudinal discharge axis defined by said torch body.

5. A plasma arc torch according to claim 1, wherein:

said outer nozzle member comprises a radially extending shoulder;

said inner nozzle member comprises a radially extending shoulder adjacent to said radially extending shoulder of said outer nozzle member; and said annular insulating element comprises:

a first ring defining said press-fit connection; and a second ring extending at least partially radially outwardly from said first ring, wherein said second ring fits between said radially extending shoulder of said outer nozzle member and said radially extending shoulder of said inner nozzle member.

6. A plasma arc torch according to claim 1, wherein said annular insulating element defines at least one port for introducing water into said water passageway.

7. A plasma arc torch according to claim 6, wherein said port extends in a direction that is generally tangential to an imaginary circle around said longitudinal discharge axis.

8. A plasma arc torch according to claim 1, further comprising a second annular insulating element press-fit between said inner and outer nozzle members, wherein said second annular insulating element is displaced along said longitudinal discharge axis from said first annular insulating element and is positioned between said first annular insulating element and said bore of said inner nozzle member.

9. A plasma arc torch according to claim 8, wherein said second annular insulating element is a swirl ring.

10. A plasma arc torch according to claim 1, wherein:

said radially interior surface of said outer nozzle member comprises:

a cylindrical surface, and a shoulder extending radially inward from said cylindrical surface; and said annular insulating element comprises:

an outer cylindrical surface press-fit to said cylindrical surface of said outer nozzle member, and a surface extending radially inward from said outer cylindrical surface of said annular insulating element and abutting said shoulder of said outer nozzle member.

11. A plasma arc torch according to claim 1, wherein:

said outer nozzle member comprises a radially exterior surface; and said nozzle assembly further comprises an outer insulating element secured onto said exterior surface of said outer nozzle member and extending around and proximate to said bore of said outer nozzle member.

12. A plasma arc torch according to claim 11, wherein said outer insulating element is constructed of a ceramic material.

13. A plasma arc torch according to claim 11, wherein said outer insulating element is constructed of a plastic material.

14. A water-injection nozzle assembly for a plasma arc torch, comprising:

an inner nozzle member formed of metallic material and comprising a radially exterior surface, wherein said inner nozzle member defines a bore therethrough;

an outer nozzle member formed of metallic material and comprising a radially interior surface, wherein said outer nozzle member is radially outward of said inner nozzle member and defines a bore therethrough that is coaxially aligned with said bore of said inner nozzle member; and an annular insulating element press-fit between said inner and outer nozzle members such that said inner and outer nozzle members are pressed together in a manner that a water passageway is defined between at least portions of said interior surface of said outer nozzle member and said exterior surface of said inner nozzle member for communicating a flow of water to said bore of said outer nozzle member, wherein said annular insulating element is constructed such that said metallic inner and outer nozzle members are electrically insulated from one another.

15. A nozzle assembly according to claim 14, wherein said inner nozzle member is formed of copper and said outer nozzle member is formed of copper.

16. A nozzle assembly according to claim 14, wherein:

said outer nozzle member comprises a radially extending shoulder;

said inner nozzle member comprises a radially extending shoulder adjacent to said radially extending shoulder of said outer nozzle member; and said annular insulating element separates said radially extending shoulder of said outer nozzle member from said radially extending shoulder of said inner nozzle member.

17. A nozzle assembly according to claim 14, wherein said annular insulating element defines at least one port for introducing water into said water passageway, and said port extends in a direction that is generally tangential to an imaginary circle that encircles the axis with which said bores are coaxially aligned so that said port is operative for vertically directing water into said water passageway.

18. A nozzle assembly according to claim 14, further comprising a second annular insulating element press-fit between said inner and outer nozzle members, wherein said second annular insulating element is displaced from said first annular insulating element and is positioned between said first annular insulating element and said bore of said inner nozzle member.

19. A nozzle assembly according to claim 18, wherein said second annular insulating element is a swirl ring.

20. A water-injection nozzle assembly for a plasma arc torch, comprising:

an inner nozzle member formed of metallic material and comprising a radially exterior surface, wherein said inner nozzle member defines a bore therethrough;

an outer nozzle member formed of metallic material and comprising a radially interior surface and a radially exterior surface, wherein said outer nozzle member is radially outward of said inner nozzle member and defines a bore therethrough that is coaxially aligned with said bore of said inner nozzle member;

an annular insulating element fit between said inner and outer nozzle members such that a water passageway is defined between at least portions of said interior surface of said outer nozzle member and said exterior surface of said inner nozzle member for communicating a flow of water to said bore of said outer nozzle member, wherein said annular insulating element is constructed such that said metallic inner and outer nozzle members are electrically insulated from one another; and an outer insulating element secured onto said exterior surface of said outer nozzle member.

21. A nozzle assembly according to claim 20, wherein said outer insulating element is constructed of a ceramic material and extends around and proximate to said bore of said outer nozzle member.

22. A nozzle assembly according to claim 20, wherein said outer insulating element is constructed of a plastic material and extends around and proximate to said bore of said outer nozzle member.

23. A nozzle assembly according to claim 20, wherein said annular insulating element defines at least one port for introducing water into said water passageway, and said port extends in a direction that is generally tangential so that said port is operative for vertically directing water into said water passageway.

* * * * *

UNITED STATES PATENT AND TRADEMARK OFFICE

CERTIFICATE OF CORRECTION

PATENT NO. : 6,156,995
DATED : December 5, 2000
INVENTOR(S) : Severance, Jr.

It is certified that error appears in the above-identified patent and that said Letters Patent is hereby corrected as shown below:

Column 16,
Line 14, "vertically" should read --vortically--;
Line 58, "vertically" should read --vortically--.

Signed and Sealed this

Tenth Day of July, 2001

Attest:

Nicholas P. Godici

NICHOLAS P. GODICI

*Attesting Officer* *Acting Director of the United States Patent and Trademark Office*